United States Patent [19]

Filipowicz et al.

[11] 4,199,459

[45] Apr. 22, 1980

[54] CONTINUOUS FILTERING-SETTLING CENTRIFUGE

[75] Inventors: Mikolaj Filipowicz; Piotr Filipowicz, both of Warsaw, Poland

[73] Assignee: Biuro Projektow Przemyslu Cukrowniczego "Cukroprojekt", Warsaw, Poland

[21] Appl. No.: 970,672

[22] Filed: Dec. 18, 1978

[30] Foreign Application Priority Data

Jan. 20, 1978 [PL] Poland .................................. 204248

[51] Int. Cl.[2] ........................ B01D 21/26; B01D 33/10

[52] U.S. Cl. .................................... 210/325; 210/370; 233/25

[58] Field of Search ........... 210/78, 325, 370, DIG. 4; 233/25

[56] References Cited

U.S. PATENT DOCUMENTS

| | | | |
|---|---|---|---|
| 975,178 | 11/1910 | Thomas | 210/325 |
| 1,794,792 | 3/1931 | Munson | 210/325 |

FOREIGN PATENT DOCUMENTS

| | | | |
|---|---|---|---|
| 12053 | 12/1902 | Austria | 210/325 |

*Primary Examiner*—Frank Sever

*Attorney, Agent, or Firm*—Ladas, Parry, Von Gehr, Goldsmith & Deschamps

[57] ABSTRACT

The subject of the invention is a continuous filtering-settling centrifuge designed for separating continuously mixtures containing solid and liquid bodies.

In the centrifuge several filtering or settling baskets are applied, situated beyond the main axis of spinning, and rotating around their own axes at an angular velocity different from the angular velocity of the centrifuge. In the particular filtering or settling baskets there is applied a system of feeding the mixture to be centrifuged, constituting a separated feeding zone, and a discharge system constituting a separate discharge zone with a chute receiver or a worm receiver. Besides, in the particular baskets there are separated zones of centrifuging, washing the solid part with a liquid, steaming of the solid part, separating of the washing agent or steaming agent, drying of the solid part, and washing of filtering screens with appropriate technical means in the particular zones. In the baskets finned partitions are applied. The finned partitions prevent a displacement of the mixture along the circumferences of the baskets, thus preventing damaging of the centrifuged solid part and the filtering screens in case of the filtering centrifuge, and also enable to drain off liquid from the basket in case of the settling centrifuge.

9 Claims, 7 Drawing Figures

CONTINUOUS FILTERING-SETTLING CENTRIFUGE

Figure 1:
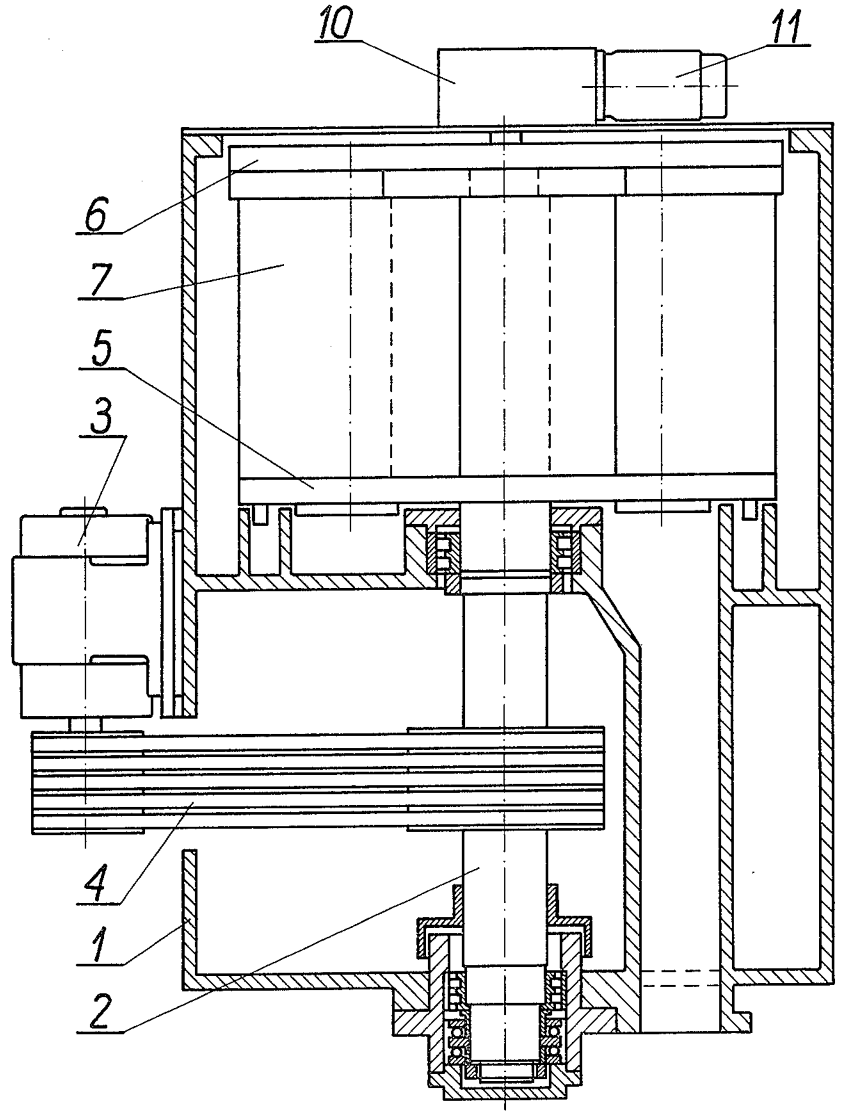

The subject of the invention is a filtering-settling centrifuge designed for continuous separation of mixtures containing liquid and solid bodies and for complete or preliminary drying of granular products. The centrifuge can be applied in chemical, food, and pharmaceutical industries, in processing of minerals, and in sewage treatment.

There are known periodical and continuous centrifuges. Among periodical centrifuges there are known filtering cylindrical vertical and horizontal centrifuges, and settling multi-disc centifuges. Among continuous centrifuges there are known filtering cylindrical horizontal centrifuges, filtering conical vertical centrifuges, settling multi-disc vertical centrifuges, and settling basket horizontal centrifuges.

The known periodical centrifuges with one cylindrical vertical or horizontal basket, used for separation of mixtures containing solid and liquid bodies, in which the separated solid bodies are discharged cyclically by means of mechanical scraping or sucking-off at low rotations of the centfifuge basket, have the following faults and disadvantages: lack of continuity of the centrifuging process; low output; required high power of drive, connected with cyclic acceleration of the centrifuge basket of large mass—and power losses connected with this; impeded filtration or settling process due to incomplete removal of centrifuged solid bodies at discharge of the centrifuge basket; losses of the centrifuged product due to the necessity of washing out the product which remains in the basket after finishing the discharge; difficulties in centrifuging of viscous solid bodies; difficulty in the application of required technological manipulations—for example washing of centrifuged solid parts; damaging of a part of the product at discharge of the basket; low degree of centrifuging of liquids, connected with the method of discharge of solid bodies; low coefficient of separation of solid bodies; wear and damage of filtrating elements.

The known centinuous centrifuges with a horizontal basket and with discharge of the centrifuged solid part by means of pushing-out or vibratory mechanisms, and continuous centrifuges with a conical vertical basket and with automatic or mechanical discharge/worm, vibratory, and other mechanisms/of the solid part, have the following disadvantages: low output of separation due to the lack of the possibility of cleaning of the filtration elements; fast wear of the filtration elements and discharging mechanisms; impossiblity or serious impedance of separation of the solid parts from viscous liquids; low coefficient of separation of solid bodies from liquids; damages to the crystals of solid bodies, which decrease the quality of the product; high humidity of the centrifuged product; serious difficulty in carrying out technological manipulations of required quality, as for instance washing of the centrifuged solid parts.

The basic disadvantages of the known settling centrifuges with a multi-disc basket, which are emptied by means of stopping and dismounting the centrifuge basket, are: the possibility of centrifuging only a small quantity of mixtures containing an inconsiderable percentage of solid bodies; discontinuity of the centrifuging process; low degree of separation of liquids; low coefficient of separating the solid bodies from the liquids.

The known settling centrifuges with a multi-disc basket equipped with devices for periodical or continuous discharge, for instance by means of nozzles or slots, are characterized by the following features: low degree of separation of liquids from solid bodies and thus the necessity of applying expensive technological manipulations for further separation of liquid; low coefficient of separation of solid bodies from liquids; additional costs required for the recovery of technological liquids; limited application, depending on the properties of solid bodies and liquids.

The known continuous settling centrifuges with a horizontal basket and with a worm discharge device rotating at a speed different from that of the basket, the so-called decantation centrifuges, enable low degree of separation of solid bodies from liquids, are characterized by high wear of the basket and the transporting mechanism, and are used only for a narrow range of mixtures.

The aforementioned known centrifuges are single-basket centrifuges. From the German Federal Republic Pat. No. 913638 there is known a centrifuge for extraction of oil from olives, consisting of several baskets rotating around their own axes and suspended in a spinning housing. The baskets of the centrifuge are driven by means of a transmission gear from the main shaft of the centrifuge. The axes of the centrifuge baskets are slightly inclined in relation to the axis of the centriguge. A granulated mass of olive fruits is fed to the baskets of the centrifuge from underneath. In the baskets of the centrifuge the olives are granulated further and oil is separated. The deoiled mass is removed from the basket from the top. This centrifuge also has the following disadvantages: range of application is limited only to extraction of oil from olives; the solid parts of the mixture and the elements of baskets are damaged.

The object of the present invention is a design of a continuous centrifuge which could perform the tasks imposed upon both the filtering and the settling centrifuges, and which would not have the aforementioned faults and disadvantages.

This object has been achieved by designing a centrifuge which has several filtering or settling baskets situated beyond the main axis of spinning, and rotating around their own axes at an angular velocity different from that of the centrifuge.

In the particular filtering or settling baskets there are applied: a system feeding the mixture to be centrifuged, which constitutes a separated feeding zone with a feeding element, and a discharge system constituting a separate discharge zone with a chute receiver or a worm receiver. Besides, the particular baskets the following zones can be separated: washing of the solid part with a liquid or/and steamming of the solid part, and washing of the filtering screens, with appropriate feeding elements. In the baskets there are finned partitions applied, set up at an angle of 0°–40°, preferably 15°–20°, in relation to the transversal axis of the baskets, and at an angle of 0°–40° in relation to the vertical axis of the baskets.

The finned partitions prevent a displacement of solid parts along the circumference of the baskets, thus enabling centrifuging of solid parts, and additionally they prevent damaging of the centrifuged solid part and of the filtering screens in case of a filtering centrifuge, and in case of a settling centrifuge they enable draining of the liquid out of the basket. The centrifuge can be equipped with guards being a sector of a cylinder flank, designed for separation of the centrifuged liquid part and the technological liquid used for washing of the solid part.

Due to the applications of the solutions according to the invention the centrifuge is characterized by the following features:

high coefficient of separation of solid bodies from liquids, which is determined by the ratio of the solid bodies content in the centrifuged mixture to the solid bodies content in the effluent, providing for high recovery of the product;

high degree of complete and preliminery drying of granulated products being centrifuged with high degree of humidity, which enables saving of time, labour and energy losses, as well as investment costs for a heating installation necessary for redrying of the product;

low power requirements for driving the centrifuge, necessary for centrifuging of a volume of the mixture of solid bodies and liquid, or a mass of granulated humid solid bodies—comparable to those of other centrifuges;

minimum losses of expensive technological liquids due to a high degree of centrifuging of solid bodies, i.e. a small content of liquid in the centrifuged product;

possibility of an easy separation of viscous solid bodies and viscous liquids at a high coefficient of separation, without the occurrence of the phenomenon consisting in gumming up of the centrifuge baskets;

easy centrifuging with a high coefficient of separation of a mechanically unstable dispersed phase, due to mild acceleration of the mixture of solid bodies and liquids.

The solution of the centrifuge according to the invention enables its application for the following production products and processes:

polymers—polyethylene, polypropylene, polystyrene, polyacrylate, polyvinyl chloride;

organic products—sugar, cellulose derivatives, vitamins, organic salts, pharmaceuticals, starch, dextrose, adipic acid, hexamine, carboxymethyl-cellulose, seaweed in the manufacture of alginates) proteins (at the production of lactose), fishmeal, animal fats;

inorganic products—coal, floatation concentrates of minerals, graphite, coal processing products, magnesite, sodium phosphate, potassium nitrate, zinc sulphate, sodium chloride, iron sulphate, titanium dioxide, kaolin, barium carbonate, barium sulphate, aluminum salts, gilsonite, and the related minerals and products;

fertilizers—urea, potassium carbonate (potash), ammonium sulphate, calcium nitrate, ammonium nitrate;

other products and processes—industrial waste treatment, sewage treatment, nitrocellulose, industrail oils and other.

Figure 2:
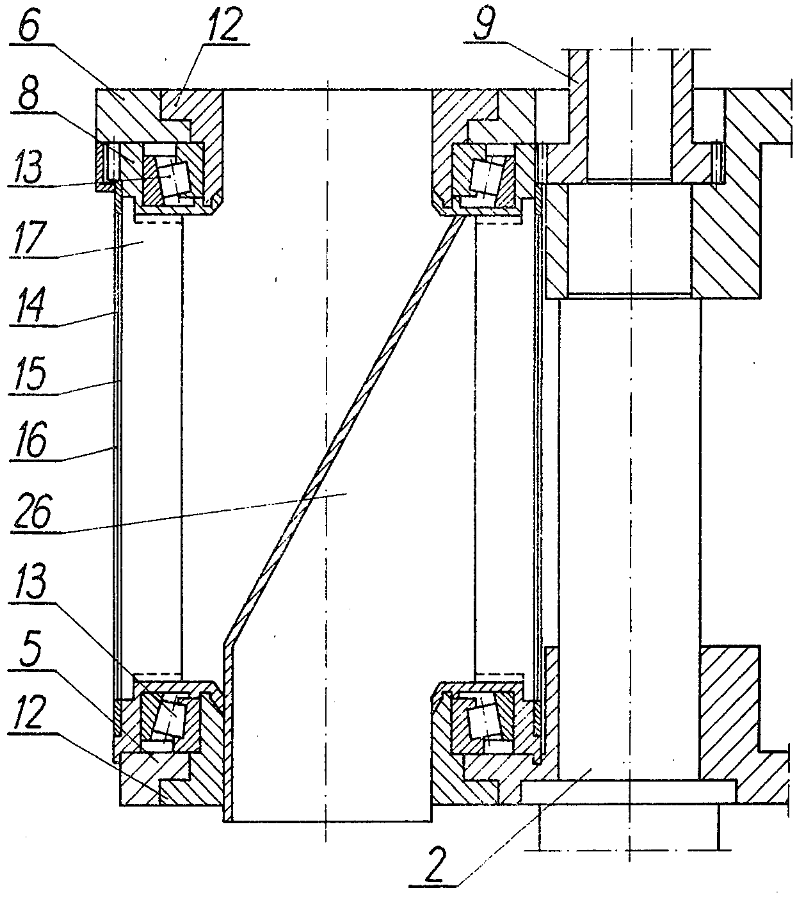
Figure 3:
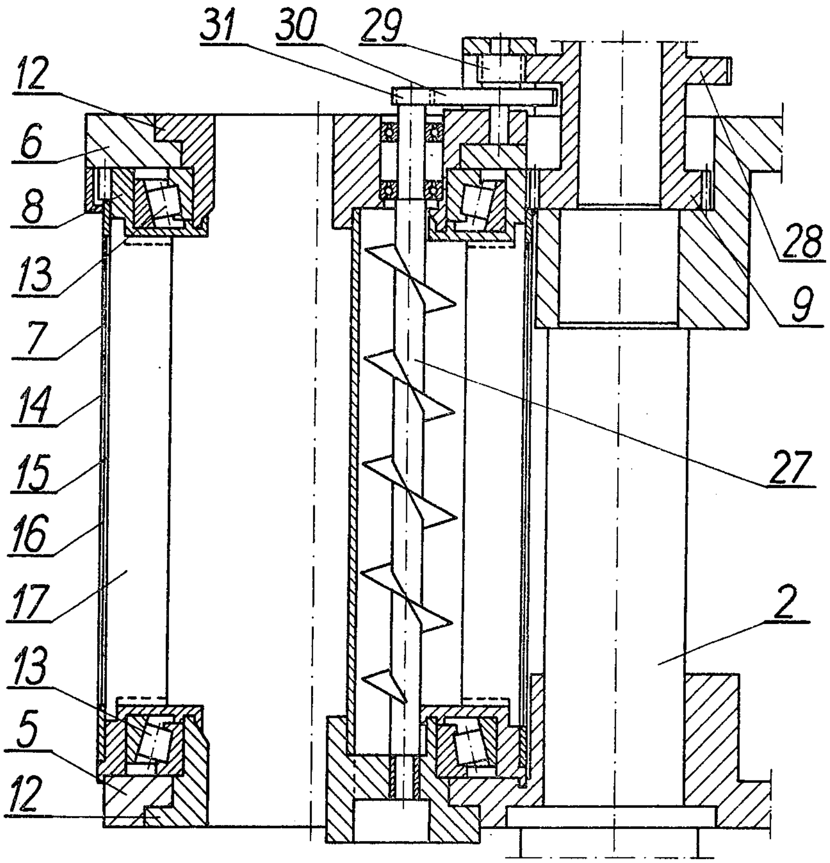
Figure 4:
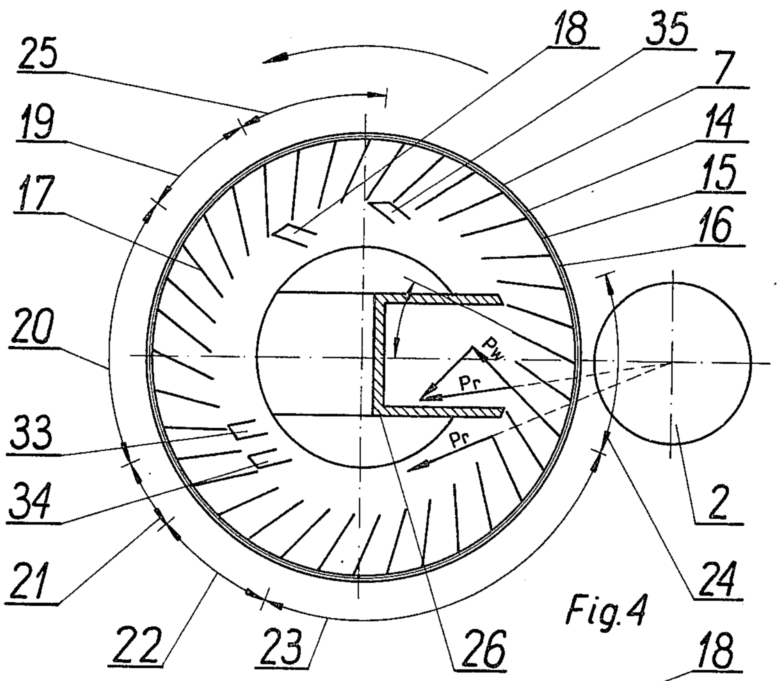
Figure 5:
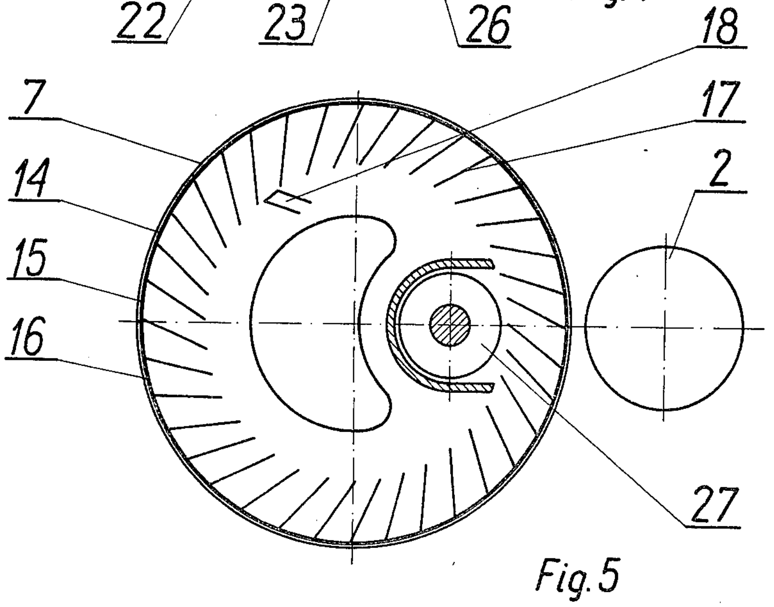
Figure 6:
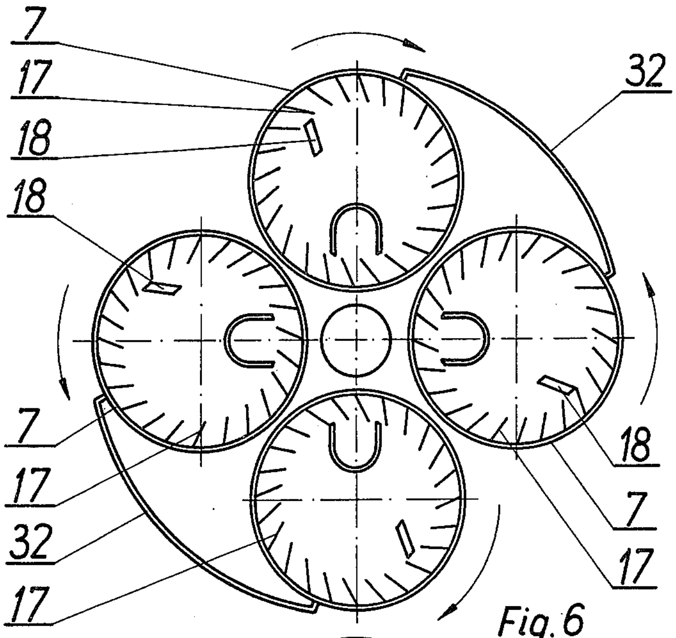
Figure 7:
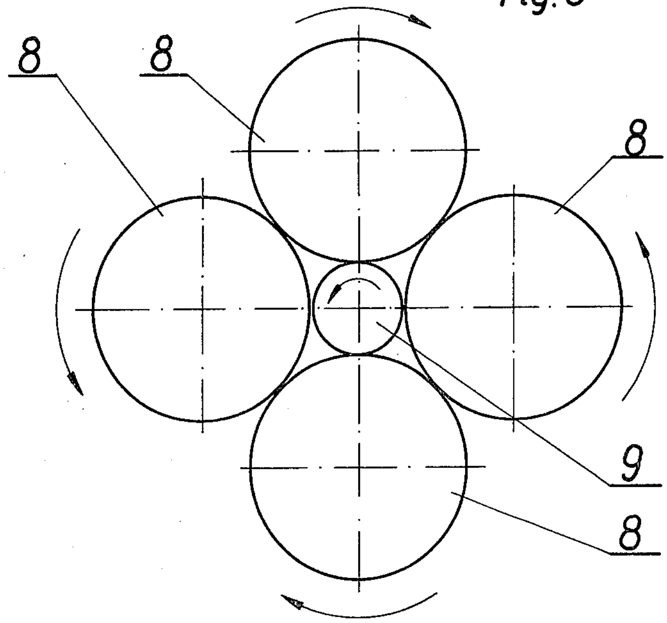

The subject of the invention is illustrated in more detail by means of an example of the realisation of a sugar centrifuge, as shown in the figures which present:

FIG. 1—longitudinal section of the centrifuge;

FIG. 2—longitudinal section of the filtering basket of the centrifuge with a chute receiver;

FIG. 3—longitudinal section of the filtering basket of the centrifuge with a worm receiver;

FIG. 4—cross-section of the filtering basket of the centrifuge with a chute receiver;

FIG. 5—cross-section of the filtering basket of the centrifuge with a worm receiver;

FIG. 6—diagrammatic cross-section of the baskets of the centrifuge;

FIG. 7—diagram of the drive of the centrifuge baskets.

The centrifuge consists mainly of a body 1, a main shaft 2 bearing-mounted in the known manner in the body, driven by a motor 3 through a belt transmission 4, from a lower disc 5 and an upper disc 6 fixed to the main shaft 2, in which filtering baskets 7 are bearing-mounted, driven around their own axes by means of toothed wheels 8 and 9 and the known planetary gear 10 and/or a separate motor 11.

Cylindrical or slightly conical filtering baskets 7 bearing-mounted by means of covers 12 and bearings 13 in discs 5 and 6 are a ring structure, easy to be producet, consisting of the known perforated or full jacket 14, the known filtering screens 15 and base grids 16, the said structure being additionally equipped with finned partitions 17 fixed to the covers 12, which prevent a displacement of the mixture being filtered and the isolated solid part along the circumference of the filtering baskets 7 during their rotation around their axes. The effect of centrifuging is obtained similarly as in the known centrifuges and it occurs in the result of rotations of the filtering baskets 7 around the axis of the main shaft 2, whereas rotations of the filtering baskets 7 around their own axes are utilized for continuous loading of the mixture being centrifuged by means of the known gravitational feeding element 18 in zone 19, for centrifuging of the liquid part in zone 20, for washing and/or steaming of solid part in zone 21 by means of washing agents fed through the known gravitational elements 33 and/or steaming agents fed through the known elements 34, for filtering of a washing agent and/or a steaming agent in zone 22, for drying of the solid part in zone 23, for discharge of solid parts from filtering baskets 7 in zone 24, due to the effect of centrifugal forces Pr shown in FIG. 4 or their components Pw, and for washing of filtering screens 15 in zone 25 by means of an agent fed through the known gravitational elements.

The particles of the product being centrifuged do not displace themselves upon filtering screens uzes 15, but only an incosiderable portion of these particles displaces itself upon smoothly machined finned partitions 17 at low velocity and at inconsiderable pressure, besides, these particles—while leaving the filtering baskets 7—have low velocity in relation to the spinning chute receiver 26 or the worm receiver 27, which does not cause abrasion or breakage of particles.

In order to facilitate the removal of liquid from the basktets of the filtering centrifuge, in case of full baskets (non-perforated), finned partitions 17 are set up at an angle of 0°-15°, preferably 2°-10°, in relation to the vertical axis of the baskets.

Due to a continuous process of centrifuging and the application of technological manipulations, and the possibility of conforming the rotational velocity of filtering baskets 7 around their own axes to the technological requirements, particles of the product being centrifuged which leave the basket are better centrifuged, washed and dried than it is in the known centrifuges.

The subject of the invention is an example of realisation of the settling centrifuge is shown also in FIG. 1, FIG. 2, FIG. 3, FIG. 4, FIG. 5, FIG. 6, FIG. 7, the basket 7 in this realization having no filtering screens 15 and no base grids 16, and the washing zone 25 being not present therein.

At centrifuging of solid bodies from liquids in the settling centrifuge according to the invention the solid particles and the liquid are under the effect of centrifugal force making the solid particles to move in the direction of the basket surface due to their density being higher than that of the liquid. The quantity of solid particles settled on the surface of the basket 7 and on the finned partitions 17 depends on thickness and length of the layer of the liquid and on the velocity of its flow. Possibility of adjusting the flow velocity of the liquid and the fact that thickness of the layer of the liquid being centrifuged decreases in the direction of its outflow, due to the finned partitions 17 being set up at an angle in relation to the vertical axes of the baskets 7 enable obtaining practically any coefficients of separation of solid bodies from liquids even for very small diameters of the solid bodies within the range of 0.5 micrometer.

In the settling centrifuge according to the invention additional technological manipulations can be applied consisting in, for instance, washing of the separated solid part by means of a liquid fed through the known gravitational element 33, or steaming by means of stoam fed through the known element 34, both elements being situated in zone 21.

The settling centrifuge according to the invention, in comparison to the known centrifuges, is distinguished by a high output at a high coefficient of separation of solid bodies from liquids, a high degree of separation of liquid from solid bodies, a high quality of the product, due to the possibility of application of additional technological manipulations, and by a wide range of application for the purpose of separation of various types of solid bodies from liquids.

In the version of the centrifuge according to the invention, as shown in FIGS. 3 and 5, in the discharge zone 24 the worm receiver 27 is applied. The worm receiver 27 is driven from the baskets 7 through the toothed wheels 8, 9, 28, 29, 30, 31.

The centrifuge according to the invention can be equipped with the guards 32 being a sector of a cylinder flank—FIG. 6. The version of the centrifuge with the guards 32 operates in the same manner as the centrifuge shown in FIGS. 1-5 and 7, and its additional advantage is the possibility of separating the centrifuged liquid part from the liquid used for washing of the solid part, due to the application of the guards 32 fixed to the discs 5 and 6.

The above mentioned examples of the application of the invention do not limit all the possibilities of applying the solution according to the invention to the process of separating a mixture of solid bodies from liquid bodies, and to dehydration of granulated solid bodies.

What is claimed is:

1. A continuous centrifuge comprising a rotatable housing, a main shaft for driving the housing, several filtering-settling baskets rotatable at an angular velocity different from that of the centrifuge, said baskets being mounted in bearings in a lower disc and in an upper disc, and driven from the main shaft by means of a motor-driven planetary gear, parts of said baskets being rotatable in a direction opposite to the direction of rotation of the other part of said baskets each of said baskets having planar finned partitions fixed to and extending inwardly a distance less than one half the diameter thereof, from the inner circumference there of, and deflected forwardly to the direction of rotation, and mounted at an angle of from 0° to 40°, in relation to the transverse axes of said baskets, and at an angle of from 0° to 40° in relation to the vertical axes of said baskets, and arcuate guard members connected between a pair of adjacent lower discs and adjacent upper discs.

2. A continuous centrifuge according to claim 1, wherein the baskets are equipped with gravitational elements feeding a mixture of solid and liquid bodies, spinning at an angular velocity equal to the angular velocity of the centrifuge, situated in the supply zone, the gravitational elements feeding washing, fluid for stripping of the solid part, situated in the solid part washing zone, with, receiver means situated in the discharge zone, and with gravitational elements feeding the washing liquid in the washing zone of the filtering screens.

3. A continuous centrifuge according to claim 1, wherein the baskets are equipped with gravitational elements feeding a mixture of solid and liquid bodies, spinning at an angular velocity equal to the angular velocity of the centrifuge, situated in the feeding zone, and with chute receivers situated in the discharge zone.

4. A continuous centrifuge according to claim 1, wherein the baskets are equipped with gravitational elements feeding a mixture of solid and liquid bodies, situated in the feeding zone and spinning at an angular velocity equal to the angular velocity of the centrifuge, with the gravitational elements feeding the washing fluid in the zone of washing the solid part, with chute receiver (26) or worm receivers receiver means situated in the discharge zone.

5. A continuous centrifuge according to claim 1, wherein the baskets are equipped with gravitational elements feeding a mixture of solid and liquid bodies, situated in the feeding zone (19) and spinning at an angular velocity equal to the angular velocity of the centrifuge, and with worm receivers situated in the discharge zone.

6. A continuous centrifuge according to claim 1, wherein said forwardly deflected finned partitions are mounted at an angle of from 15° to 20° in relation to the transverse axes of the baskets.

7. A continuous centrifuge according to claim 1, wherein said forwardly directed finned partitions are mounted at an angle of from 2° to 10° in relation to the vertical axes of the baskets.

8. A continuous centrifuge according to claim 1, wherein said baskets are equipped with chute receivers mounted in the lower disc and in the upper disc, said chute receivers being situated closely adjacent to the main shaft.

9. A continuous centrifuge according to claim 1, wherein said baskets are equipped with a vertically mounted, rotatable worm-like receiver mounted between the upper and lower discs, and closely adjacent to the main shaft.

* * * * *